Dec. 4, 1928.
F. LOMBARD
1,694,069
EXTENSION FOR FLY SWATTERS
Filed Aug. 6, 1927
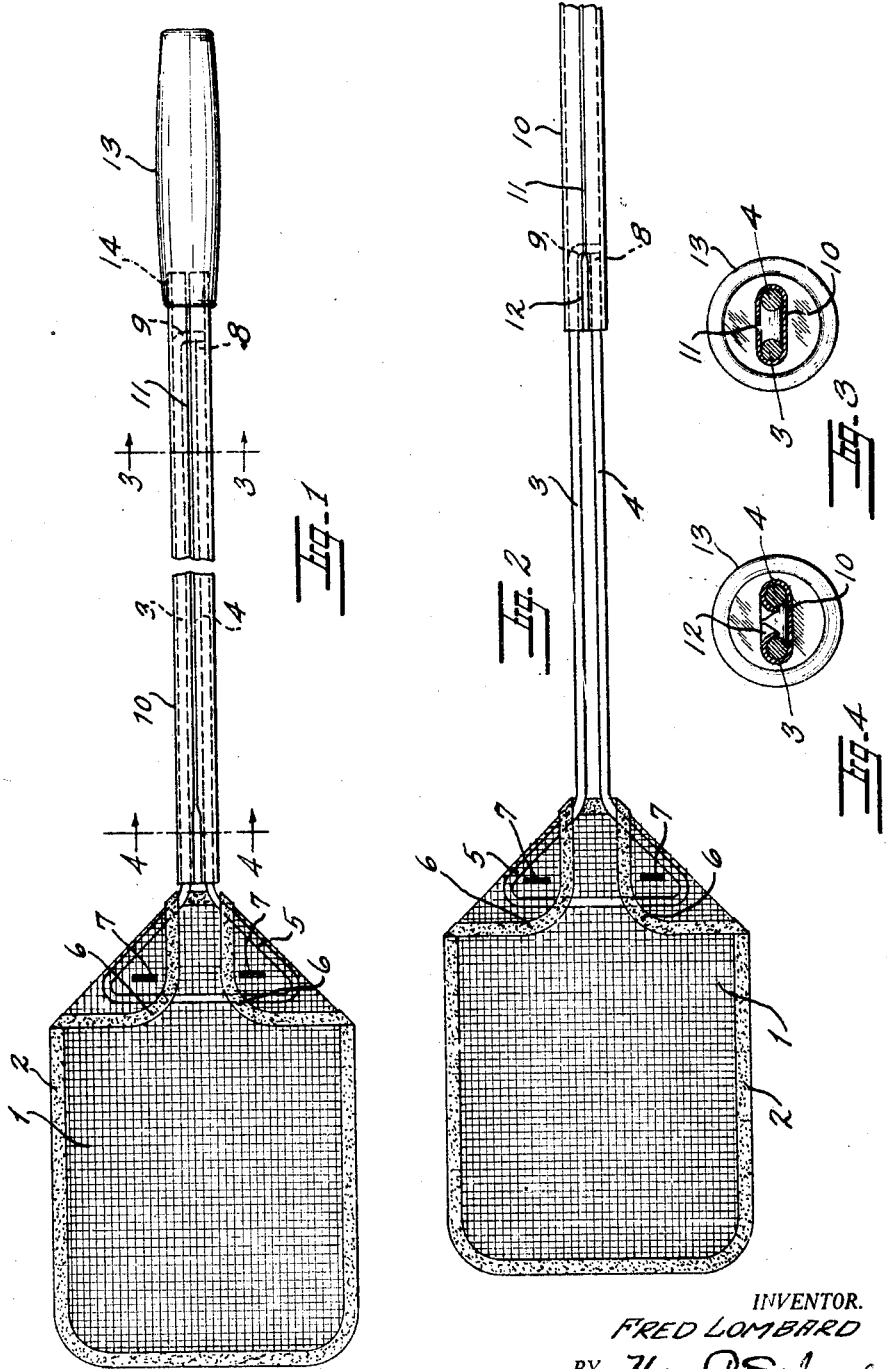
INVENTOR.
FRED LOMBARD
BY Harry C. Schroeder
ATTORNEY Patented Dec. 4, 1928.

1,694,069

UNITED STATES PATENT OFFICE.

FRED LOMBARD, OF SANTA ROSA, CALIFORNIA.

EXTENSION FOR FLY SWATTERS.

Application filed August 6, 1927. Serial No. 211,224.

My invention relates to extension fly-swatter. The conventional type of fly-swatter now upon the market consists of a flexible swatting screen from which there extends a short handle. This handle ordinarily is of such a short length that the user is obliged to stand on a chair or the like in order to reach flies that have settled on the wall near the ceiling or on the ceiling.

The need at the present time for a fly-swatter which has a handle sufficiently long to reach insects that have settled on the ceiling, and the need of a fly-swatter which may conveniently and compactly be stored away has given rise to this invention. It is an object of this invention, therefore, to provide a fly-swatter which has a handle that is extensible and which may be extended or retracted at will.

A further object of the invention is to provide a device which is strong and durable, attractive in its appearance, compact in its construction, efficient in its operation and which is well adapted to perform the services required of it.

Other objects of the invention will become apparent as the description proceeds.

Referring to the accompanying drawing, wherein a preferred embodiment of my invention is disclosed, Figure 1 is a plan view of the device, showing the handle in retracted position, Figure 2 is a fragmentary view similar to Figure 1, showing the device with the handle extended, Figure 3 is a sectional view substantially along the line of 3—3 of Figure 1, and Figure 4 is a sectional view taken substantially along the line 4—4 of Figure 1.

The above figures adequately illustrate my invention, and I will now proceed with a description of the operative parts that form my invention.

Similar characters of reference in all the above mentioned views designate similar parts throughout and the approved fly-swatter involves in its general organization a screen mesh member 1 having a reinforcing border 2, fixed thereto. An integral resilient wire is bent as shown in Figures 2 and 3 to provide a pair of parallel arms 3 and 4 which arms merge into a triangular loop 5. This triangular loop is placed on the wire screen mesh 1 and the corners 6 of the same are bent over the diverging sides of the triangular loop and are fastened in position by staples 7 or the like which extend through the triangular loop. The extreme outer end of the arm 4 terminates abruptly as at 8 and the end of the arm 3 is bent laterally to rest against this arm 8 as clearly shown at 9 in Figures 1 and 2. A casing 10 is provided to receive the parallel arms 3 and 4. While this casing may be formed in any suitable manner and of any suitable material, yet it is preferable to form the same of rolled sheet metal on account of the cheapness, lightness, strength and durability of the latter. This casing is elongated and is of such width as to accommodate both of the parallel arms 3 and 4. The casing is rolled as clearly shown in Figure 2 to provide a seam 11, which may be either open or closed as desired, but is shown as being open in the drawing. One end of this casing is open to receive the parallel arms 3 and 4 and the metal adjacent the seam (shown at 12) is bent inwardly so as to prevent removal of the parallel arms 3 and 4. The conventional type of handle 13 having a socket 14 therein is adapted to be received on the other end of the tubular member. The above mentioned parts adequately define my invention, and I will now proceed with the description of the operation of the device.

When flies well within reach of the user are to be exterminated, the parallel arms 3 and 4 may be slid completely into the casing, but when it is desired to reach flies that would ordinarily be out of reach, it is merely necessary to pull the parallel arms from the casing until the member 9, acting as a stop, engages the bent-in portions 12. These bent-in portions frictionally engage the parallel arms and retain the same in any desired position.

The above description taken in connection with the accompanying drawing is believed to be sufficient to adequately illustrate the construction, use and many advantages of the herein described fly-swatter. I do not desire to limit myself to the exact arrangement of parts shown in the accompanying drawings and described in this specification only in so far as I particularly point out my invention, in the appended claims do I desire to be limited.

Claims:

1. An extension fly-swatter comprising in combination a wire screen mesh portion, a resilient member formed of wire, bent upon itself to provide parallel arms, said resilient member being attached to said mesh portion, one of said parallel arms terminating abruptly and the other of said parallel arms extending laterally to abut against said first mentioned arm, a casing surrounding said parallel arms and being slidable thereon, and means extending inwardly from said casing adapted to engage said arm which extends laterally, to prevent removal of the same.

2. A fly-swatter comprising in combination a substantially rectangular wire screen mesh, a resilient wire member bent upon itself to provide elongated parallel arms, said mesh being bent about a portion of said resilient wire member and secured thereto, one of said parallel arms terminating abruptly and the other of said parallel arms extending laterally to overlie said arm which terminates abruptly, a rolled sheet metal casing extending about said parallel arms, said sheet metal casing having an open seam therein, the adjacent edges of which are bent inwardly adjacent one end between said parallel arms to provide a stop for said arm which extends laterally, and a handle on one end of said sheet metal casing.

In testimony whereof I affix my signature.

FRED LOMBARD.